United States Patent [19]

Kawamoto

[11] Patent Number: 5,587,278

[45] Date of Patent: Dec. 24, 1996

[54] POLYESTER PHOTOGRAPHIC SUPPORT

[75] Inventor: Fumio Kawamoto, Kanagawa, Japan

[73] Assignee: Fuji Photo Film Co., Ltd., Kanagawa, Japan

[21] Appl. No.: 164,962

[22] Filed: Dec. 10, 1993

[30] Foreign Application Priority Data

Dec. 11, 1992 [JP] Japan ................................. 4-331928

[51] Int. Cl.$^6$ ................................................. G03C 1/795
[52] U.S. Cl. .......................... 430/533; 264/234; 264/235; 264/342 RE; 264/345; 264/346
[58] Field of Search ........................... 430/533; 264/234, 264/235, 342 RE, 345, 346

[56] References Cited

U.S. PATENT DOCUMENTS

| | | | |
|---|---|---|---|
| 4,140,740 | 2/1979 | DeSmedt et al. | 264/342 RE |
| 4,141,735 | 2/1979 | Schrader et al. | 264/342 RE |
| 4,994,214 | 2/1991 | Stevens et al. | 264/342 RE |

*Primary Examiner*—John S. Y. Chu
*Attorney, Agent, or Firm*—Sughrue, Mion, Zinn, Macpeak & Seas

[57] ABSTRACT

A polyester support prepared by the step of subjecting a polyester film to bulk rolling and heating the bulk rolled polyester film to a temperature of from 50° C. to the glass transition point of said polyester film, or subjecting a polyester film to bulk rolling at a temperature of from 50° C. to the glass transition point of said polyester film, resulting in the polyester support, wherein the glass transition point of said polyester film is 90° to 200° C., and wherein the step of bulk rolling has a start tension of 3 to 75 kg/m per unit width of the polyester film and an end tension of 3 to 75 kg/m per unit width of the polyester film.

11 Claims, 1 Drawing Sheet

POLYESTER PHOTOGRAPHIC SUPPORT

FIELD OF THE INVENTION

The present invention relates to a polyester photographic support which is less likely to have a curling effect and does less damage to the flatness of film in heat treatment and which results in an even coating of an emulsion thereon.

BACKGROUND OF THE INVENTION

In general, a photographic material is manufactured by coating at least one photographic light-sensitive layer on a plastic film support. A plastic film for the photographic support usually uses a fiber polymer represented by triacetyl cellulose (hereinafter referred to as "TAC") and a polyester polymer represented by polyethylene terephthalate (hereinafter referred to as "PET"). In recent years, polyethylene naphthalate, which has more heat resistance than PET, has been investigated.

The available photographic materials are generally film for an X-ray, film for plate making, those in a sheet form and roll form. Roll film can be color film or black and white negative film, which is packed in a patrone with the width of 35 mm or less and loaded in a conventional camera to use for photography.

The support for TAC film has been mainly used for roll film. The TAC film as a photographic support does not have an optical anisotropy, has a high transparency, and has an excellent property for eliminating curling after development processing. The property of excellent curling elimination originates from the molecular structure of the TAC film. The TAC film has a relatively high water absorption and can make a molecular chain movable by water absorption in development processing. Accordingly, the curling effect which the TAC film has while it is stored in the form of roll film can be removed by allowing the fixed molecular chains thereof to be rearranged.

Meanwhile, in photographic materials comprising a film having no property to remove the curling effect, problems include the generation of scratches and focal fuzziness in the printing process in which an image is formed on a photographic printing paper after development, and jamming in transporting, when in roll form.

In recent years, the applications of photographic materials have diversified, to rapidness in transporting film in photography, high magnification in photography, and the miniaturization of photographic equipment. These require the characteristics of strength, dimensional stability, and a thinner support for photographic materials.

However, as the TAC film has a rigid molecular structure, the membrane quality of the film obtained after the preparation thereof is fragile and is difficult to use in these applications.

In contrast, a polyester film has excellent productivity, mechanical strength and dimensional stability and therefore it is expected to be an alternative to TAC film.

In the polyester film, the curling effect strongly remains in roll form, which is widely used for photographic materials. Accordingly, the handling property after development processing is bad, and while it has the above mentioned excellent characteristics, it is difficult to use in the form of roll film, and the problem is involved therein. A means for solving this curling effect is mentioned in U.S. Pat. No. 4,141,735, where the curling can be reduced by subjecting film to heat treatment. However, the simple heating of a bulk roll generates roll tightening, an accretion and a crinkle, which turn to an uneven coating of the emulsion and make it impossible to use in practical applications.

SUMMARY OF THE INVENTION

An object of the present invention is to provide a polyester photographic support which is less likely to have a curling effect in heat treatment and which has a good ability to remain flat.

This and other objects of the present invention have been achieved by a polyester support prepared by the step of (1) subjecting a polyester film to bulk rolling and heating the bulk rolled polyester film to a temperature of from 50° C. to the glass transition point of the polyester film, or (2) subjecting a polyester film to bulk rolling at a temperature from 50° C. to the glass transition point of the polyester film, resulting in the polyester support, wherein the glass transition point of said polyester film is 90° to 200° C., and wherein the step of bulk rolling has a start tension (an initial tension) of 3 to 75 kg/m per unit width of the polyester film and an end tension (a final tension) of 3 to 75 kg/m per unit width of the polyester film.

DETAILED DESCRIPTION OF THE INVENTION

Figure 1:
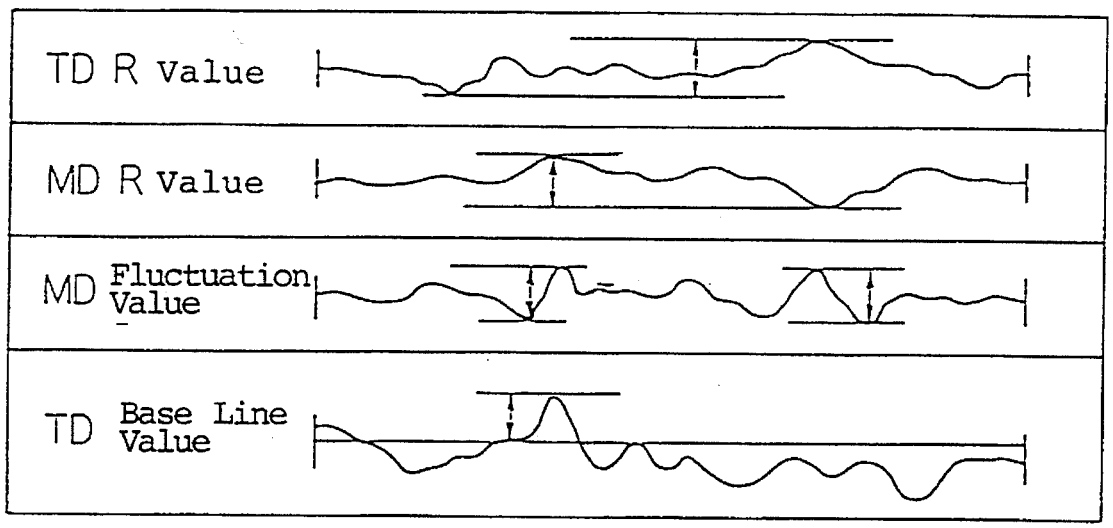
FIG. 1 is an explanatory view explaining the conditions of the thickness pattern of a photographic polyester film of the present invention.

The polyester photographic support used in the present invention includes the polymer obtained by the condensation polymerization of dibasic carboxylic acid or the ester derivatives thereof with glycol, mainly comprising ethylene glycol. Other polymers and additives may be added thereto, or two or more kinds of dibasic acids and two or more kinds of glycols may be copolymerized, or two or more kinds of polyesters may be blended as long as the transparency of the film, the dimensional stability, and the mechanical strength are not damaged.

The polyester in the present invention is prepared from diol and dibasic acid such as dicarboxylic acid. Examples of dibasic acids include terephthalic acid, isophthalic acid, phthalic acid, phthalic anhydride, succinic acid, glutaric acid, adipic acid, sebacic acid, succinic anhydride, maleic acid, fumaric acid, maleic anhydride, itaconic acid, citraconic anhydride, tetrahydrophthalic anhydride, diphenylene-p,p'-dicarboxylic acid, tetrachlorophthalic anhydride, 3,6-endomethylenetetrahydrophthalic anhydride, 1,4-cyclohexane-dicarboxylic acid,

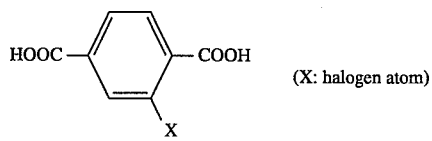

(X: halogen atom)

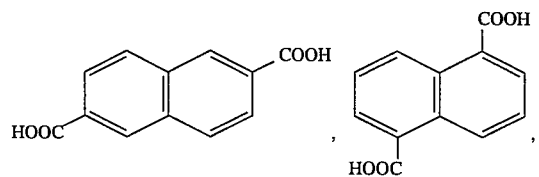

-continued

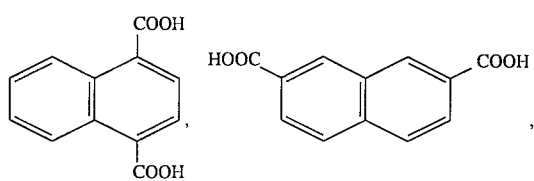

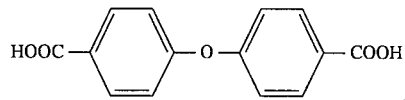

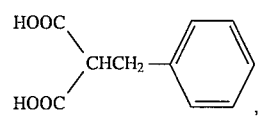

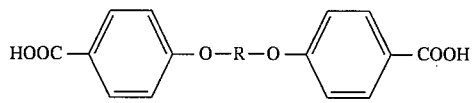

(R: $C_1$ to $C_5$ alkylene group)

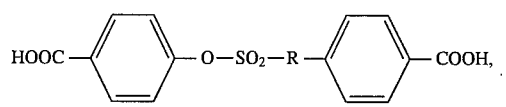

(R: $C_1$ to $C_5$ alkylene group)

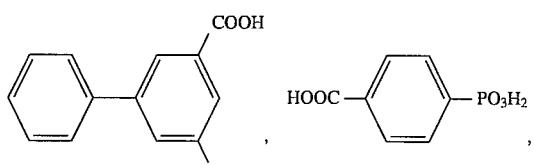

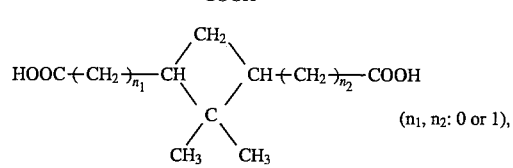

(R$_1$, R$_2$: $C_1$ to $C_5$ alkylene group)

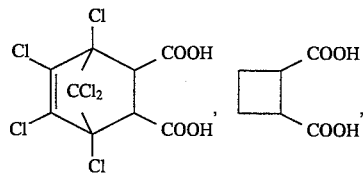

Preferred examples of diol include ethylene glycol, 1,3-propanediol, 1,2-propanediol, 1,4-butanediol, 1,5-pentanediol, 1,6-hexanediol, 1,7-heptanediol, 1,8-octanediol, 1,10-decanediol, 1,12-dodecanediol, 1,4-cyclohexanediol, 1,4-cyclohexanedimethanol, 1,3-cyclohexanediol, 1,1-cyclohexanedimethanol, catechol, resorcin, hydroquinone, 1,4-benzenedimethanol,

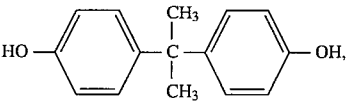

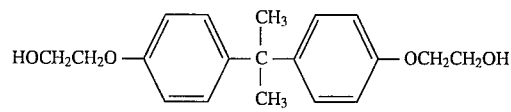

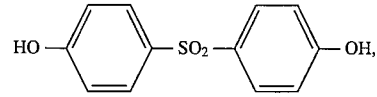

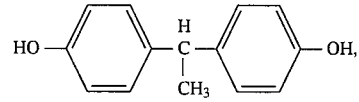

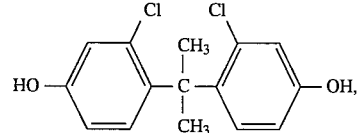

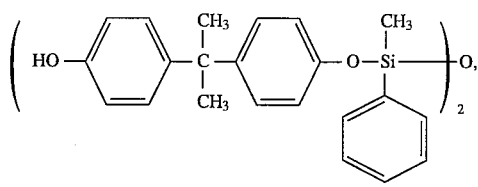

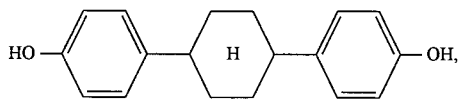

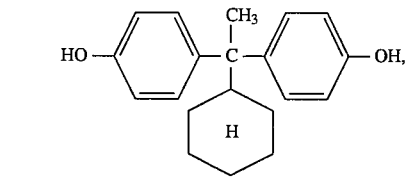

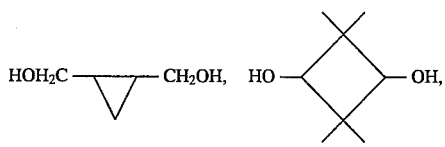

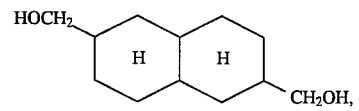

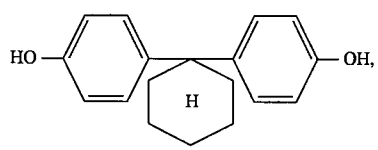

-continued

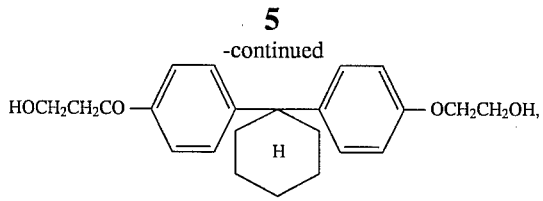

Further, a hydroxyl group-containing compound with a single function or a polyfunction of 3 or more functions, or an acid-containing compound may be copolymerized according to necessity.

A compound having a hydroxyl group and a carboxyl group (or ester thereof) together in a molecule may be copolymerized with the polyester according to the present invention.

The following preferred compounds include:

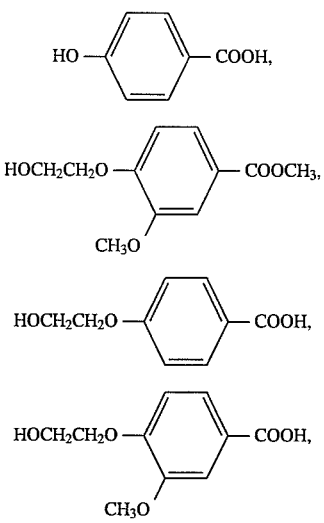

Among the polyesters consisting of these diols and dicarboxylic acids, more preferred polyesters include a homopolymer such as polyethylene-2,6-dinaphthalate (PEN), polyarylate (PAr) and polycyclohexanedimethanol terephthalate (PCT); polyesters obtained by copolymerizing a dicarboxylic acid such as 2,6-naphthalene dicarboxylic acid (NDCA), terephthalic acid (TPA), isophthalic acid (IPA), or thophthalic acid (OPA), cyclohexane dicarboxylic acid (CHDC) and paraphenylene dicarboxylic acid (PPDC), a diol such as ethylene glycol (EG), cyclohexane dimethanol (CHDM), neopentyl glycol (NPG), bisphenol A (BPA) and biphenol (BP), and a hydroxylcarboxylic acid such as parahydroxylbenzoic acid (PHBA) and 6-hydroxyl-2-naphthalenecarboxylic acid (HNCA). Of these polyesters, more preferred are the copolymer of 2,6-naphthalene dicarboxylic acid, terephthalic acid and ethylene glycol (the mixing mole ratio of naphthalene-dicarboxylic acid to terephthalic acid is preferably from 0.3:0.7 to 1.0:0, more preferably from 0.5:0.5 to 0.8:0.2), the copolymer of terephthalic acid, ethylene glycol and bisphenol A (the mixing mole ratio of ethylene glycol to bisphenol A is preferably from 0.6:0.4 to 0:1.0, more preferably from 0.5:0.5 to 0.1:0.9), the copolymer of isophthalic acid, paraphenylene dicarboxylic acid, terephthalic acid and ethylene glycol (the mole ratios of isophthalic acid and paraphenylene dicarboxylic acid to terephthalic acid is preferably from 0.1 to 10.0 and from 0.1 to 20.0, more preferably from 0.2 to 5.0 and from 0.2 to 10.0, respectively, based on the assumption that the terephthalic acid is 1), the copolymer of naphthalene dicarboxylic acid, neopentyl glycol and ethylene glycol (the mole ratio of neopentyl glycol to ethylene glycol is preferably from 1:0 to 0.7:0.3, more preferably from 0.9:0.1 to 0.6:0.4), the copolymer of terephthalic acid, ethylene glycol and biphenol (the mole ratio of ethylene glycol to biphenol is preferably from 0:1.0 to 0.8:0.2, more preferably from 0.1:0.9 to 0.7:0.3), and the copolymer of parahydroxylbenzoic acid, ethylene glycol and terephthalic acid (the mole ratio of parahydroxylbenzoic acid to ethylene glycol is preferably from 1:0 to 0.1:0.9, more preferably from 0.9:0.1 to 0.2:0.8); and the polymer blend such as PEN and PET (composition ratio: preferably from 0.3:0.7 to 1.0:0, more preferably from 0.5:0.5 to 0.8:0.2), and PET and PAr (composition ratio: preferably from 0.6:0.4 to 0:1.0, more preferably from 0.5:0.5 to 0.1:0.9).

Among these polyesters, PEN (polyethylene-2,6-dinaphthalate) is the most balanced. It has a high dynamic strength, particularly a high elastic modulus, and the glass transition point is as high as approximately 120° C. However, it has a defect in that it emits a fluorescence. Meanwhile, PCT has a high dynamic strength, and the glass transition point is as high as approximately 110° C. However, it has a defect in that it has a very high crystallization speed and less easily provides a transparent film. Among these polymers, PAr has the highest glass transition point (190° C.). However, it has a defect in that it has a weaker dynamic strength compared to PET. Accordingly, in order to compensate for these defects, a blend of these polymers or the copolymer of the monomers constituting these polymers can be used.

These homopolymers and copolymers can be synthesized according to the known manufacturing methods for polyester. For example, an acid component is subjected directly to an esterification reaction with a glycol component, or in the case where dialkyl ester is used as the acid component, it is first subjected to a transester with the glycol component and then heated under reduced pressure to remove the surplus glycol component, whereby polyester can be synthesized. Or, the acid component may be converted to acid halide to react with glycol, wherein an ester exchange reaction, a catalyst and a polymerization reaction catalyst may be used and a heat resistant stabilizing agent may be added, if desired. These polyester synthetic methods can be carried out with reference to the descriptions of, for example, *High Polymer Experiment* Vol. 5 "Condensation Polymerization and Polyaddition", pp. 103 to 136 (Kyoritsu Syuppan Co., Ltd., 1980), and *Synthetic High Polymer V*, pp. 187 to 286 (Asakura Shoten Co., Ltd., 1971).

Further, they can be carried out with reference to JP-B-48-40414 (the term "JP-B" as used herein means an "examined Japanese patent publication"), JP-A-50-81325 (the term "JP-A" as used herein means an "unexamined published Japanese patent application"), JP-A-1-287129, JP-A-1-266130, JP-A-1-266133, JP-A-55-115425, JP-A-1-244446, and JP-A-4-93937.

The preferred average molecular weight of these polyesters is from 10,000 to 500,000.

The polymer blend of the polymers thus obtained can easily be prepared according to the methods described in JP-A-49-5482, JP-A-64-4325, and JP-A-3-192718, and Research Disclosures 283,739 to 283,741, 284,779 to 284,782, and 294,807 to 294,814.

Further, in order to improve the adhesion between dissimilar polyesters, a part of the dissimilar polyesters can be blended in these polyesters, the monomers constituting the dissimilar polyesters can be copolymerized, or a monomer having an unsaturated bond can be copolymerized with polyester to carry out a radical cross linking.

The polyester photographic support used in the present invention includes DET, polyethylene naphthalate, polycyclohexanedimethanol terephthalate, polyarylate, polyethylene-2,6-naphthalene dicarboxylate and blends thereof; with polyethylene naphthalate, polyethylene-2,6-naphthalene dicarboxylate being particularly preferred. Various publicly known additives can be incorporated into the polyester film according to the present invention.

The problem of edge fogging which is generated because of the high refraction index of a support is one of the characteristic problems in using a polyester film as a support for photographic material.

Polyester film has a refraction index of 1.6 to 1.7 and gelatin exclusively used for a subbing layer and a photographic emulsion layer has a refraction index of 1.50 to 1.55. The ratio of the refraction index thereof to that of gelatin is smaller than 1 and light incident from a film edge is likely to reflect at the interface between a base and an emulsion layer. Accordingly, the polyester film is likely to cause a light piping phenomenon (edge fogging).

In the present invention, a dye, which does not increase a film phase, can be added in order to prevent the light piping phenomenon. The dye used is not specifically limited. The dye having a color tone of gray is preferred in light of the general character of a photographic material. Further preferred is the dye having an excellent heat resistance at the film forming temperature region of a polyester film and an excellent compatibility with polyester. Diaresin, manufactured by Mitsubishi Kasei Corporation and Kayaset, manufactured by Nippon Kayaku Co., Ltd. are the preferred dyes. Coloring density is generally 0.01 or more, preferably 0.03 or more in terms of a value measured with a densitometer manufactured by Macbeth Co., Ltd.

A UV absorber may be mixed in these polymer films for preventing fluorescence and providing an aging stabilizer. Those having no absorptions in a visible wavelength region are desirable as the UV absorber, and the added amount is usually from 0.01 to 20% by weight, preferably from 0.05 to 1.0% by weight, based on the weight of the polymer film. Examples of such UV absorber include a benzophenone UV absorber, such as 2,4-dihydroxylbenzophenone, 2-hydroxyl-4-methoxybenzophenone, 2-hydroxyl-4-n-octoxybenzophenone, 4-dodecyloxy-2-hydroxylbenzophenone,2,2',4,4'-tetrahydroxylbenzophenone, and 2,2'-dihydroxyl-4,4'-dimethoxybenzophenone; a benzotriazole UV absorber, such as 2(2'-hydroxyl-5-methylphenyl)benzotriazole, 2(2'-hydroxy-3',5'-di-t-butylphenyl)benzotriazole, and 2(2'-hydroxyl-3'-di-t-butyl-5'-methylphenyl)benzotriazole; and a salicylic acid UV absorber, such as phenyl salicylate and methyl salicylate.

The heat treatment according to the present invention is generally carried out between 50° C. and the glass transition point for 0.1 to 500 hours. This effect is more rapidly accelerated at the higher heat treatment temperature. However, the heat treatment temperature exceeding the glass transition point moves the molecules in the film into disorder, expands conversely a free volume, and provides a film in which the molecules can easily move, that is, a curling effect is easily formed. Accordingly, this heat treatment is required to be carried out at the temperature of the glass transition point or lower.

Meanwhile, a temperature of 50° C. or lower promotes the curling effect only at a markedly slow speed and therefore requires an unrealistic amount of time.

Accordingly, this heat treatment is desirably carried out at a temperature which is a little lower than the glass transition point; preferably from 50° C. to the glass transition point; more preferably from a temperature lower than the glass transition point by 30° C. to the glass transition point, for the shortening of the processing time.

Meanwhile, when the heat treatment is carried out at this temperature, the effect can be observed after 0.1 hour. A time of 1500 hours or more almost saturates the effect. Accordingly, the heat treatment time is generally from 0.1 hour to 1500 hours.

The rolling tension according to the present invention will be described. The polyester according to the present invention is shrunk because of the heat treatment exerted at a temperature from 50° C. to the glass transition temperature. A weak tension causes the problem of weaving before the heat treatment.

Meanwhile, a strong tension causes shrinking during heat treatment and generates an accretion and wrinkle, which notably damages the flatness of the base and makes it unsatisfactory as a photographic support.

The tension at the beginning of rolling is preferably from 3 to 75 kg/m, more preferably 10 to 40 kg/m, per unit width of the polyester support. The tension at the end of rolling is preferably 3 to 75 kg/m, more preferably 5 to 35 kg/m, per unit width of the polyester support. The tension was measured by using a functional transtention detector (LX-TC-100 manufactured by Mitsubishi Electric Corp.).

A thickness pattern and a circular value will be described. The presence of an unevenness in thickness and a bow on a base leads to flatness deterioration, such as an accretion and a wrinkle in subjecting a bulk roll to the heat treatment, which in turn results in an uneven coating in the emulsion. Accordingly, the value of Max-Min (TD R value, wherein TD and R mean a transverse direction and a range, respectively) in the whole widthwise direction is generally 8 μm or less, preferably 6 μm or less, and more preferably 3 μm or less. The value of Max-Min (MD R value, wherein MD means a machine direction) with the length of 5 m in the lengthwise direction is generally 10 μm or less, preferably 8 μm or less, and more preferably 6 μm or less. The thickness difference (MD fluctuation) between the adjacent hill and hollow is generally 8 μm or less, preferably 6 μm or less, and more preferably 4 μm or less. Based on a base line which is the average of the thicknesses at both ends, the maximum value (the base line value) of hills above this base line is generally 5 μm or less, preferably 3 μm or less, and more preferably 2 μm or less. The circular value (the maximum displacement from the line obtained by connecting both ends of the base with the width of 40 m which is spread on a plane) is generally 40 mm or less, preferably 20 mm or less, and more preferably 10 mm or less. These displacements may be 0 or more.

The core according to the present invention is generally from 100 to 600 mm. A diameter smaller than this generates an accretion and wrinkle in carrying out the heat treatment. The diameter more than 600 mm makes the film roll bulky and is inconvenient and unrealistic to store and transport. The diameter is preferably from 150 to 450 mm, more preferably from 200 to 400 mm.

The core according to the present invention is indispensably a circle.

Examples of the material for these cores include metal, ceramics, ceramic-coated metal and fiber winding plastic. Among them, preferred are metal and ceramics. The preferred examples of metals include aluminum, stainless steel (the alloy of iron, chromium and nickel), brass (the alloy of copper and nickel), copper, iron, and duralumin (the alloy containing copper, magnesium, manganese, and silicon). Aluminum, stainless steel and iron are more preferred. The ceramics are not specifically limited, but the preferred examples of ceramics include $3Al_2O_3\text{-}2SiO_2$, $BaTiO_3$, $SrTiO_3$, $Y_2O_3\text{-}ThO_2$, $ZrTiO_3$, $ZrO_2$, $Si_3N$, $SiCMgO\cdot SiO_2$, and $MgCr_2O\text{-}TiO_2$. More preferred are $3Al_2O_3\text{-}2SiO_2$, $BaTiO_3$, $SrTiO_3$, and $ZrO_2$.

The core according to the present invention may comprise the mixture or laminate of two or more kinds of materials. For example, the surface of aluminum may be covered either with $Al_2O_3$ or $CrO_2$. Or, the surface of a stainless steel material may be covered with $CrO_2$ and may be subjected to a surface coating with a very thin fluorine resin in some cases.

A film is formed preferably by a melting extrusion or biaxially stretching formation method. That is, the material is melted and extruded on a rotary cooling device at a temperature of from the melting point to 350° C. to form an amorphous non-crystalline sheet, and then the sheet is roll-stretched from 3.0 to 3.5 times, preferably from 3.2 to 3.5 times at a temperature of from 70° to 160° C., preferably from 80° to 130° C. in the lengthwise direction; tenter-stretched from 3.0 to 4.2 times, preferably from 3.5 to 4.0 times at a higher temperature than the temperature in the lengthwise stretching and at a temperature of from 70° to 160° C., preferably from 80° to 130° C., in the widthwise (crosswise) direction; heat-fixed at a temperature of from that in the widthwise stretching to 260° C., preferably from 150° to 250° C. ; heat-relaxed by 0.1 to 10%, preferably 0.5 to 5%; and then cooled to roll. A simultaneous biaxial stretching of a stretching and tenter clip system is preferably used as well. Further, after applying a widthwise stretching, a lengthwise stretching can be applied once again. The deviation from the above stretching ranges destroys a widthwise and lengthwise balance in loading, and the provision of heat treatment deteriorates the flatness and makes the sheet unsuitable as a photographic support.

The thickness of the polyester film used in the present invention is preferably from 60 to 90 μm. A thickness of less than 60 μm is not preferred since it cannot stand the shrinking stress in a light-sensitive layer generated in drying and causes a conduit-like curling. A thickness of more than 90 μm is inconsistent with the miniaturization of a camera and a patrone.

The conventional methods, such as that described in JP-B-57-36129, can be used as the knurling used in the present invention. In the present invention, the longer and broader the bulk is, the longer the processing time is, and the higher the processing time is, the more effective the knurling is.

The thickness subjected to knurling preferably is 5 to 50 μm larger than the average thickness.

These UV absorbers may be incorporated into an undercoat layer, a backing layer, an emulsion layer, or an antihalation layer.

The above-mentioned polyester film can be provided with a sliding character according to an application. The means for providing the sliding character is not specifically limited. The mixing of an inactive inorganic compound or the coating of a surface active agent is used as the general means. Further, the method by which an internal particle system in which a catalyst added in a polyester polymerization reaction is deposited can be used.

The examples of the inactive inorganic compounds include $SiO_2$, $TiO_2$, $BASO_4$, $CaCO_3$, talc, and kaolin. Transparency is an important requisite in the support for a photographic material, and therefore preferred are $SiO_2$ having a refraction index relatively close to that of a polyester film and the internal particle system, which can make the size of the deposited particles relatively small.

Where the sliding character is provided by mixing, the method in which a layer provided with a function is laminated is preferably used as well in order to obtain more transparency of the film. To be specific, a co-extruding method by a plurality of the extruders and a feed block or a multi-manifold dye can be used.

When polyester is molded to film, polyester obtained after finishing a polymerization may be subjected to a film formation process as it still remains melted; or after it is once molded to a pellet, it may be subjected to the film formation process. When it is molded to the pellet, it is preferably dried before it is subjected to an extrusion molding.

In the present invention, the glass transition temperature and thickness pattern are measured in the following manner.
Glass transition temperature (Tg):

Tg is defined as the arithmetic mean of the temperature at which a standard line starts deviating from a base line and the temperature at which it comes back to a new base line when a sample 10 mg film is heated with a differential thermal analysis meter (DSC) at 20° C. /minute in a stream of helium-nitrogen; or the temperature showing the maximum value of an endothermic peak when the endothermic peak appears at Tg.
Thickness pattern:

The thickness is measured with an electric micrometer manufactured by Anritsu Corporation at the speed of 600 mm/minute to record on a chart paper at the contraction scale of 1/20 and the chart speed of 30 mm/minute, and then the chart is measured with a ruler and rounded to the first decimal point.

The knurling in the present invention was carried out by the publicly known method shown in JP-B-57-36129. In order to improve the adhesive character and the wetting character of a coating solution, the polyester film can be subjected in advance to various surface treatments such as a corona discharge treatment, a chemical treatment, and a flame treatment, if desired. Among these surface treatments, most preferably used for the present invention is the corona discharge treatment in which the deposition of a low polymer on a film surface is small.

The polyester support of the present invention has preferably a subbing layer in order to improve an adhering force with a photographic layer such as a light-sensitive layer which is provided thereon.

The subbing layer includes a subbing layer provided by using a polymer latex comprising a styrene-butadiene copolymer or a vinyldiene chloride copolymer, and a subbing layer provided by using a hydrophilic binder such as gelatin. The subbing layer preferably used in the present invention is a hydrophilic binder.

The examples of the hydrophilic binders used in the present invention include a water soluble polymer, such as gelatin, gelatin derivatives, casein, agar, sodium alginate, starch, polyvinyl alcohol, a polyacrylic acid copolymer, and a maleic anhydride copolymer; cellulose ester, such as carboxymethyl cellulose and hydroxyethyl cellulose; and a latex polymer, such as a vinyl chloride-containing copolymer, a vinyldiene chloride-containing copolymer, an acrylic acid ester-containing copolymer, a vinyl acetate-containing copolymer, and a butadiene-containing copolymer. Of them, more preferred is gelatin.

The examples of the compound which swell the support used in the present invention include resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trifluoroacetic acid, and chloral hydrate. Of them, preferred are resorcin and p-chlorophenol.

Various gelatin hardeners can be used for the subbing layer according to the present invention.

The examples of the gelatin hardeners include a chromium salt (e.g., chrome alum), aldehydes (e.g., formaldehyde, glutaraldehyde), isocyanates, an active halogen compound (e.g., 2,4-dichloro-6-hydroxyl-s-triazine), and an epichlorohydrin resin.

An inorganic fine particle such as $SiO_2$ and $TiO_2$, or a polymethyl methacrylate copolymer fine particle (diameter: 1 to 10 μm) can be incorporated into the subbing layer according to the present invention as a matting agent.

The subbing layer according to the present invention can be coated by the coating methods generally known, for example, a dip coating method, an air knife coating method, a curtain coating method, a wire bar coating method, a gravure coating method, and an extrusion coating method.

The photographic material according to the present invention can have a non-light-sensitive layer such as an antihalation layer, an intermediate layer, a backing layer, and a surface protective layer.

There may be applied as a binder for the backing layer, a hydrophobic polymer or a hydrophilic polymer as that used for the subbing layer.

An antistatic agent, a sliding agent, a matting agent, a surface active agent, and a dye can be incorporated into the backing layer of the photographic material according to the present invention. The antistatic agent used in the backing layer according to the present invention is not specifically limited. Examples of anionic high polymer electrolytes include a high polymer containing a carboxylic acid, a carboxylic acid salt and a sulfonic acid salt, for example, the high polymers described in JP-A-48-22017, JP-B-46-24159, JP-A-51-30725, JP-A-51-129216, and JP-A-55-95942. Examples of cationic high polymers include those described in JP-A-49-121523, JP-A-48-91165, and JP-B-49-24582. Further, examples of ionic surface active agents include as well an anionic one and a cationic one, and these can be the compounds described in JP-A-49-85826, JP-A-49-33630, U.S. Pat. Nos. 2,992,108 and 3,206,312, JP-A-48-87826, JP-B-49-11567, JP-B-49-11568, and JP-A-55-70837.

More preferred as the antistatic agent for the backing layer of the present invention is the fine particle of at least one crystalline metal oxide selected form $ZnO$, $TiO_2$, $SnO_2$, $Al_2O_3$, $In_2O_3$, $SiO_2$, $MgO$, $BaO$, and $MoO_2$, or the composite oxide thereof.

The fine particle of the conductive crystalline oxide or the composite oxide thereof used in the present invention has a volume resistivity of $10^7$ Ω cm or less, more preferably $10^5$ Ω cm or less. The particle size thereof is preferably 0.01 to 0.7 μm, more preferably 0.02 to 0.5 μm.

The manufacturing methods for the fine particle of the conductive crystalline oxide or the composite oxide thereof used in the present invention are described in JP-A-56-143430 and JP-A-60-258541. Easily applied are, first, the method in which a metal oxide fine particle is formed by calcination and subjected to heat treatment under the presence of a dissimilar atom which improves conductivity. Second, the method in which the dissimilar atom for improving conductivity is allowed to coexist when the metal oxide fine particle is manufactured by the calcination. Third, the method in which when the metal oxide fine particle is manufactured by the calcination, an oxygen concentration in an atmosphere is reduced to introduce an oxygen deficiency. Preferred examples in which the dissimilar atom is contained include Al and In to ZnO; Nb and Ta to $TiO_2$; and Sb, Nb and a halogen atom to $SnO_2$. The addition amount of the dissimilar atom is preferably from 0.01 to 30 mol %, more preferably from 0.1 to 10 mol %.

The present invention will be explained below with reference to the examples but shall not be construed as being limited thereto. All parts are by weight unless indicated.

EXAMPLES

Example 1

1) Kind and heat treatment of support (polyester film)

Various polyester film rolls consisting of the materials shown in Tables 1 to 5 and having the thickness patterns shown therein and the forms of a bulk roll were used to carry out the heat treatment at the conditions shown in Tables 1 to 5. This confirms a flatness after the heat treatment (the presence of a wrinkle and an accretion). Then, the coating of the subbing layer was carried out in the following item 2) and the following processes.

TABLE 1

| | Support | | | | Tension Heat treatment in rolling | | | | Flatness after | Evenness of |
| | Kind | Tg* (°C.) | Thickness (μm) | Width (mm) | Length (m) | Temperature (°C.) | Time (hr) | Start (kg/m) | End (kg/m) | heat treatment | Emulsion coating |
|---|---|---|---|---|---|---|---|---|---|---|---|
| 1 (Inv.) | PEN | 120 | 85 | 800 | 1200 | 110 | 6 | 50 | 40 | flat | even |
| 2 (Inv.) | PEN | 120 | 85 | 800 | 1200 | 110 | 6 | 50 | 50 | flat | even |
| 3 (Inv.) | PEN | 120 | 85 | 800 | 1200 | 110 | 6 | 30 | 20 | flat | even |
| 4 (Inv.) | PEN | 120 | 85 | 800 | 1200 | 110 | 6 | 20 | 15 | flat | even |
| 5 (Inv.) | PEN | 120 | 85 | 800 | 1200 | 110 | 6 | 3 | 3 | flat | even |
| 6 (Inv.) | PEN | 120 | 85 | 800 | 1200 | 110 | 6 | 75 | 75 | flat | even |
| 7 (Inv.) | PEN | 120 | 85 | 800 | 1200 | 110 | 6 | 75 | 35 | flat | even |
| 8 (Inv.) | PEN | 120 | 85 | 800 | 1200 | 110 | 6 | 10 | 3 | flat | even |
| 1 (Comp.) | PEN | 120 | 85 | 800 | 1200 | 110 | 6 | 3 | 1 | not flat | uneven |
| 2 (Comp.) | PEN | 120 | 85 | 800 | 1200 | 110 | 6 | 80 | 80 | not flat | uneven |

*Glass transition point.

TABLE 2

| | Present Invention | | | | | | | | Comparison | | | |
|---|---|---|---|---|---|---|---|---|---|---|---|---|
| Kind | 9 PEN | 10 PEN | 11 PEN | 12 PEN | 13 PEN | 14 PEN | 15 PEN | 16 PEN | 17 PEN | 3 PEN | 4 PEN | 5 PEN | 6 PEN |
| Support | | | | | | | | | | | | | |
| Glass transition point (°C.) | 120 | 120 | 120 | 120 | 120 | 120 | 120 | 120 | 120 | 120 | 120 | 120 | 120 |
| Thickness (μm) | 85 | 85 | 85 | 85 | 85 | 85 | 85 | 85 | 85 | 85 | 85 | 85 | 85 |
| Width (mm) | 1000 | 1000 | 1000 | 1000 | 1000 | 1000 | 1000 | 1000 | 1000 | 1000 | 1000 | 1000 | 1000 |
| Length (m) | 2000 | 2000 | 2000 | 2000 | 2000 | 2000 | 2000 | 2000 | 2000 | 2000 | 2000 | 2000 | 2000 |
| Heat treatment | | | | | | | | | | | | | |
| Temprature (°C.) | 110 | 110 | 110 | 110 | 110 | 110 | 110 | 110 | 110 | 110 | 110 | 110 | 110 |
| Time (hr) | 24 | 24 | 24 | 24 | 24 | 24 | 24 | 24 | 24 | 24 | 24 | 24 | 24 |
| Tension (kg/m) | | | | | | | | | | | | | |
| Start in rolling | 30 | 30 | 30 | 30 | 30 | 30 | 30 | 30 | 30 | 30 | 30 | 30 | 30 |
| End in rolling | 20 | 20 | 20 | 20 | 20 | 20 | 20 | 20 | 20 | 20 | 20 | 20 | 20 |
| Thickness pattern | | | | | | | | | | | | | |
| TD R value (μm) | 5 | 4 | 4 | 4 | 5 | 4 | 4 | 5 | 5 | 5 | 10 | 5 | 5 |
| MD R value (μm) | 4 | 4 | 3 | 3 | 4 | 4 | 5 | 4 | 4 | 4 | 4 | 12 | 4 |
| MD fluctuation value (μm) | 5 | 3 | 3 | 3 | 5 | 4 | 3 | 5 | 5 | 5 | 5 | 5 | 10 |
| TD base value (μm) | 3 | 4 | 2 | 4 | 3 | 3 | 3 | 3 | 3 | 3 | 3 | 3 | 3 |
| Circular value (mm) | 8 | 8 | 8 | 8 | 8 | 8 | 8 | 8 | 30 | 45 | 8 | 8 | 8 |
| Flatness after heat treatment | flat | flat | flat | flat | flat | flat | flat | flat | flat | not flat | not flat | not flat | not flat |
| Emulsion coating unevenness | None | None | None | None | None | None | None | None | None | * | * | * | * |

| | Comparison | | | | | | | |
|---|---|---|---|---|---|---|---|---|
| Kind | 7 PEN | 8 PEN | 9 PEN | 10 PEN | 11 PEN | 12 PEN | 13 PEN | 14 PEN | 15 PEN |
| Support | | | | | | | | | |
| Glass transition point (°C.) | 120 | 120 | 120 | 120 | 120 | 120 | 120 | 120 | 120 |
| Thickness (μm) | 85 | 85 | 85 | 85 | 85 | 85 | 85 | 85 | 85 |
| Width (mm) | 1000 | 1000 | 1000 | 1000 | 1000 | 1000 | 1000 | 1000 | 1000 |
| Length (m) | 2000 | 2000 | 2000 | 2000 | 2000 | 2000 | 2000 | 2000 | 2000 |
| Heat treatment | | | | | | | | | |
| Temperature (°C.) | 110 | 110 | 110 | 110 | 110 | 110 | 110 | 110 | 110 |
| Time (hr) | 24 | 24 | 24 | 24 | 24 | 24 | 24 | 24 | 24 |
| Tension (kg/m) | | | | | | | | | |
| Start in rolling | 30 | 30 | 30 | 30 | 30 | 30 | 30 | 30 | 30 |
| End in rolling | 20 | 20 | 20 | 20 | 20 | 20 | 20 | 20 | 20 |
| Thickness pattern | | | | | | | | | |
| TD R value (μm) | 5 | 9 | 5 | 11 | 3 | 4 | 4 | 5 | 5 |
| MD R value (μm) | 4 | 4 | 12 | 4 | 13 | 4 | 5 | 4 | 5 |
| MD fluctuation value (μm) | 5 | 5 | 5 | 5 | 4 | 10 | 6 | 5 | 5 |
| TD base value (μm) | 7 | 3 | 3 | 2 | 3 | 3 | 8 | 3 | 4 |
| Circular value (mm) | 8 | 8 | 8 | 8 | 8 | 8 | 8 | 8 | 8 |
| Flatness after heat treatment | not flat | not flat | not flat | not flat | not flat | not flat | not flat | not falt | not flat |
| Emulsion coating unevenness | * | * | * | * | * | * | * | * | * |

*Generated

TABLE 3

| | Invention | | | Comparison | | | |
|---|---|---|---|---|---|---|---|
| Kind | 18 PEN | 19 PEN | 20 PEN | 16 PEN | 17 PEN | 18 PEN | 19 PEN |
| Support | | | | | | | |
| Glass transition point (°C.) | 120 | 120 | 120 | 120 | 120 | 120 | 120 |
| Thickness (μm) | 85 | 85 | 85 | 85 | 85 | 85 | 85 |
| Width (mm) | 1200 | 1200 | 1200 | 1200 | 1200 | 1200 | 1200 |
| Length (m) | 3500 | 3500 | 3500 | 3500 | 3500 | 3500 | 3500 |
| Heat treatment | | | | | | | |
| Temperature (°C.) | 110 | 110 | 110 | 110 | 110 | 110 | 110 |
| Time (hr) | 12 | 12 | 12 | 12 | 12 | 12 | 12 |

TABLE 3-continued

|  | Invention | | | Comparison | | | |
|---|---|---|---|---|---|---|---|
| Kind | 18 PEN | 19 PEN | 20 PEN | 16 PEN | 17 PEN | 18 PEN | 19 PEN |
| Tension (kg/m) | | | | | | | |
| Start in rolling | 30 | 30 | 30 | 30 | 30 | 30 | 30 |
| End in rolling | 20 | 20 | 20 | 20 | 20 | 20 | 20 |
| Core materil | Al | SS | Fe | P | PVC | PS | BL |
| Thickness pattern | | | | | | | |
| TD R value (μm) | 5 | 4 | 4 | 4 | 5 | 4 | 4 |
| MD R value (μm) | 4 | 4 | 3 | 3 | 4 | 4 | 5 |
| MD fluctuation value (μm) | 5 | 3 | 3 | 3 | 5 | 4 | |
| TD base value (μm) | 3 | 4 | 2 | 4 | 3 | 3 | 3 |
| Knurling | | | | | | | |
| Thickness added by knurling (μm) | 40 | 40 | 40 | 40 | 40 | 40 | 40 |
| Width (mm) | 15 | 15 | 15 | 15 | 15 | 15 | 15 |
| Circular value (mm) | 12 | 12 | 12 | 12 | 12 | 12 | 12 |
| Flatness after heat treatment | flat | flat | flat | not flat | not flat | not flat | not flat |
| Emulsion coating unevenness | None | None | None | * | * | * | * |

*Generated
Note Al: aluminium, Fe: iron, SS: stainless steel, P: paper, PVC: polyvinyl chloride, PS: polystyrene, BL: bakelite.

TABLE 4

|  | Invention | | | Comp. |
|---|---|---|---|---|
| Kind | 21 PEN | 22 PEN | 23 PEN | 20 PEN |
| Support | | | | |
| Glass transition point (°C.) | 120 | 120 | 120 | 120 |
| Thickness (μm) | 85 | 85 | 85 | 85 |
| Width (mm) | 1500 | 1500 | 1500 | 1500 |
| Length (m) | 3500 | 3500 | 3500 | 3500 |
| Heat treatment | | | | |
| Temperature (°C.) | 115 | 115 | 115 | 115 |
| Time hr | 36 | 36 | 36 | 36 |
| Tension (kg/m) | | | | |
| Start in rolling | 30 | 30 | 30 | 30 |
| End in rolling | 20 | 20 | 20 | 20 |
| Core | | | | |
| Diameter (mm) | 300 | 100 | 600 | 80 |
| Material | Al | Al | Al | Al |
| Thickness pattern | | | | |
| TD R value (μm) | 4 | 4 | 4 | 4 |
| MD R value (μm) | 8 | 8 | 8 | 8 |
| MD fluctuation value (μm) | 7 | 7 | 7 | 7 |
| TD base value (μm) | 4 | 4 | 4 | 4 |
| Circular value (mm) | 10 | 10 | 10 | 10 |
| Flatness after heat treatment | flat | flat | flat | not flat |
| Emulsion coating unevenness | None | None | None | * |

*Generated

TABLE 5

|  | Invention | | | Comparison | | |
|---|---|---|---|---|---|---|
| Kind | 24 PEN | 25 PEN | 26 PEN | 21 PEN | 22 PEN | 23 PEN |
| Support | | | | | | |
| Glass transition point (°C.) | 120 | 120 | 120 | 120 | 120 | 120 |
| Thickness (μm) | 85 | 85 | 85 | 85 | 85 | 85 |
| Width (mm) | 1500 | 1500 | 1500 | 1500 | 1500 | 1500 |
| Length (m) | 5000 | 5000 | 5000 | 5000 | 5000 | 5000 |
| Orientation magnification | | | | | | |
| Longitudinal (times) | 3.2 | 3.2 | 3.2 | 3.2 | 3.2 | 3.2 |
| Lateral (times) | 3.5 | 3.5 | 3.5 | 3.5 | 3.5 | 3.5 |
| Heat treatment | | | | | | |
| Temperature (°C.) | 110 | 110 | 110 | 110 | 110 | 110 |
| Time (hr) | 24 | 24 | 24 | 24 | 24 | 24 |

TABLE 5-continued

|  | Invention | | | Comparison | | |
|---|---|---|---|---|---|---|
| Kind | 24 PEN | 25 PEN | 26 PEN | 21 PEN | 22 PEN | 23 PEN |
| Tension (kg/m) | | | | | | |
| Start in rolling | 30 | 30 | 30 | 30 | 30 | 30 |
| End in rolling | 20 | 20 | 20 | 20 | 20 | 20 |
| Core | | | | | | |
| Diameter (mm) | 300 | 300 | 300 | 300 | 300 | 300 |
| Material | Al | Al | Al | Al | Al | Al |
| Thickness pattern | | | | | | |
| TD R value ($\mu$m) | 5 | 4 | 4 | 5 | 4 | 4 |
| MD R value ($\mu$m) | 4 | 4 | 3 | 4 | 4 | 5 |
| MD fluctuation value ($\mu$m) | 5 | 3 | 3 | 5 | 4 | 3 |
| TD base value ($\mu$m) | 3 | 4 | 2 | 3 | 3 | 3 |
| Knurling | | | | | | |
| Thickness added by knurling ($\mu$m) | 30 | 30 | 30 | 30 | 3 | 56 |
| Width (mm) | 15 | 15 | 15 | 15 | 15 | 15 |
| Circular value (mm) | 10 | 30 | 40 | 10 | 10 | 10 |
| Flatness after heat treatment | flat | flat | flat | not flat | not flat | not flat |
| Emulsion coating unevenness | None | None | None | * | * | * |

*Generated

2) Coating of the subbing layer

The support of the present invention was subjected to a corona discharge treatment on both sides, and then the subbing layer coating solution of the following composition was applied to provide the subbing layer. In the corona discharge treatment, the support with a width of 30 cm was treated with the solid state corona treating equipment 6 KVA model (manufactured by Pillar Co.) at 20 m/minute. It was found from the read values of the currency and the voltage in the treatment that the object to be treated was subjected to the treatment of 0.375 kV·A·minute/m². A discharge frequency in the treatment was 9.6 kHz and a roll gap clearance between an electrode and a dielectric substance was 1.6 mm.

Composition of the subbing layer coating solution:

| Gelatin | 3 g |
| Distilled water | 250 ml |
| Sodium $\alpha$-sulfo-di-2-ethylhexyl-succinate | 0.05 g |
| Formaldehyde | 0.02 g |

3) Coating of the back layer

After the subbing layer was coated, the backing layer of the following composition was applied on the opposite side of the support side.

3-1) Preparation of the conductive fine particle dispersion (zinc oxide-antimony oxide composite dispersion):

Stannic oxide hydrate 230 parts by weight and antimony trichloride 23 parts by weight were dissolved in ethanol 3,000 parts by weight to obtain an even solution 1N sodium hydroxide aqueous solution was dropped to this solution until the pH of the above solution became 3 to obtain the coprecipitate of colloidal stannic oxide and antimony oxide The coprecipitate obtained was left to stand at 50° C. for 24 hours to obtain a reddish brown colloidal precipitate The reddish brown colloidal precipitate was separated by centrifugation. In order to remove the surplus ions, water was added to the precipitate to wash it and water was separated by the centrifugation The operation was repeated three times whereby the surplus ions were removed.

The colloidal precipitate, 200 parts by weight from which the surplus ions were removed, was dispersed once again in water 1500 parts by weight The solution was sprayed in a kiln heated at 600° C. to obtain the bluish fine particle powder of a tin oxide-antimony oxide composite with an average particle size of 0.2 $\mu$m. This fine particle powder had a specific resistance of 25 $\Omega$·cm The mixed solution of the above fine particle powder 40 parts by weight and water 60 parts by weight was adjusted to pH 7.0 and roughly dispersed with a stirrer. Then, the solution was dispersed with a horizontal type sand mill (the brand name: Dyno Mill, manufactured by WILLYAIBA-CHOFENAG) until residence time became 30 minutes 3-2) Coating of the back layer:

The following composition (A) was coated so that the dry layer thickness became 0.3 $\mu$m, and the coated layer was dried at 115° C. for 60 seconds. Further, the following covering layer coating solution (B) was coated thereon so that the dry layer thickness became 0.1 $\mu$m, and the coated layer was dried at 115° C. for 3 minutes Composition (A):

| Above conductive fine particle dispersion | 10 parts |
| Gelatin | 1 part |
| Water | 27 parts |
| Methanol | 60 parts |
| Resorcin | 2 parts |
| Polyoxyethylene nonylphenyl ether | 0.01 part |

Covering layer coating solution (B):

| Cellulose triacetate | 1 part |
| Acetone | 70 parts |
| Methanol | 15 parts |
| Dichloromethylene | 10 parts |
| p-Chlorophenol | 4 parts |

4) Coating of the light-sensitive layer:

The respective layers of the compositions shown below were simultaneously coated on the respective supports obtained in the above manner to prepare the multi-layer color light-sensitive materials Composition of the light-sensitive layer The primary materials used for the respective layers are classified as follows:

| ExC: Cyan coupler | UV: UV absorber |
|---|---|
| ExM: Magenta coupler | HBS: High boiling solvent |
| ExY: Yellow coupler | H: Gelatin hardener |
| ExS: Sensitizing dye | |

The numerals corresponding to the respective components show the coated amounts in terms of a $g/m^2$ unit and the coated amounts converted to silver in the case of silver halide In the case of the sensitizing dyes, the coated amount per mole of silver halide contained in the same layer is shown in terms of a mole unit Sample 101

First layer (antihalation layer):

| Black colloidal silver | silver | 0.18 |
|---|---|---|
| Gelatin | | 1.40 |
| ExM-1 | | 0.18 |
| ExF-1 | | $2.09 \times 10^{-3}$ |
| HBS-1 | | 0.20 |

Second layer (intermediate layer):

| Emulsion G | silver 0.065 |
|---|---|
| 2,5-Di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |

Third layer (low-sensitivity red-sensitive emulsion layer):

| Emulsion A | silver 0.25 |
|---|---|
| Emulsion B | silver 0.25 |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.10 |
| ExC-5 | 0.020 |
| ExC-7 | 0.0050 |
| ExC-8 | 0.010 |
| Cpd-2 | 0.025 |
| HBS-1 | 0.10 |
| Gelatin | 0.87 |

Fourth layer (middle-sensitivity red-sensitive emulsion layer):

| Emulsion D | silver 0.70 |
|---|---|
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.025 |
| ExC-7 | 0.0010 |
| ExC-8 | 0.0070 |
| Cpd-2 | 0.023 |
| HBS-1 | 0.10 |
| Gelatin | 0.75 |

Fifth layer (high-sensitivity red-sensitive emulsion layer):

| Emulsion E | silver 1.40 |
|---|---|
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.12 |
| ExC-3 | 0.045 |
| ExC-6 | 0.020 |
| ExC-8 | 0.025 |
| Cpd-2 | 0.050 |
| HBS-1 | 0.22 |
| HBS-2 | 0.10 |
| Gelatin | 1.20 |

Sixth layer (intermediate layer):

| Cpd-1 | 0.10 |
|---|---|
| HBS-1 | 0.50 |
| Gelatin | 1.10 |

Seventh layer (low-sensitivity green-sensitive emulsion layer):

| Emulsion C | silver 0.35 |
|---|---|
| ExS-4 | $3.0 \times 10^{-5}$ |
| ExS-5 | $2.1 \times 10^{-4}$ |
| ExS-6 | $8.0 \times 10^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

Eighth layer (middle-sensitivity green-sensitive emulsion layer):

| Emulsion D | silver 0.80 |
|---|---|
| ExS-4 | $3.2 \times 10^{-5}$ |
| ExS-5 | $2.2 \times 10^{-4}$ |
| ExS-6 | $8.4 \times 10^{-4}$ |
| ExM-2 | 0.13 |
| ExM-3 | 0.030 |
| ExY-1 | 0.018 |
| HBS-1 | 0.16 |
| HBS-3 | $8.0 \times 10^{-3}$ |
| Gelatin | 0.90 |

Ninth layer (high-sensitivity green-sensitive emulsion layer):

| Emulsion E | silver 1.25 |
|---|---|
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.010 |
| ExM-1 | 0.030 |
| ExM-4 | 0.040 |
| ExM-5 | 0.019 |
| Cpd-3 | 0.040 |

| HBS-1 | 0.25 |
| --- | --- |
| HBS-2 | 0.10 |
| Gelatin | 1.44 |

Tenth layer (yellow filter layer):

| Yellow colloidal silver | silver 0.030 |
| --- | --- |
| Cpd-3 | 0.16 |
| HBS-1 | 0.60 |
| Gelatin | 0.60 |

Eleventh layer (low-sensitivity blue-sensitive emulsion layer):

| Emulsion C | silver 0.18 |
| --- | --- |
| ExS-7 | $8.6 \times 10^{-4}$ |
| ExY-1 | 0.020 |
| ExY-2 | 0.22 |
| ExY-3 | 0.50 |
| ExY-4 | 0.020 |
| HBS-1 | 0.28 |
| Gelatin | 1.10 |

Twelfth layer (middle-sensitivity blue-sensitive emulsion layer):

| Emulsion D | silver 0.40 |
| --- | --- |
| ExS-7 | $7.4 \times 10^{-4}$ |
| ExC-7 | $7.0 \times 10^{-3}$ |
| ExY-2 | 0.050 |
| ExY-3 | 0.10 |
| HBS-1 | 0.050 |
| Gelatin | 0.78 |

Thirteenth layer (high-sensitivity blue-sensitive emulsion layer):

| Emulsion F | silver 1.00 |
| --- | --- |
| ExS-7 | $4.0 \times 10^{-4}$ |
| ExY-2 | 0.10 |
| ExY-3 | 0.10 |
| HBS-1 | 0.070 |
| Gelatin | 0.86 |

Fourteenth layer (first protective layer):

| Emulsion G | silver 0.20 |
| --- | --- |
| UV-4 | 0.11 |
| UV-5 | 0.17 |
| HBS-1 | $5.0 \times 10^{-2}$ |
| Gelatin | 1.00 |

Fifteenth layer (second protective layer):

| H-1 | 0.40 |
| --- | --- |
| B-1 (diameter: 1.7 μm) | $5.0 \times 10^{-2}$ |
| B-2 (diameter: 1.7 μm) | 0.10 |
| B-3 | 0.10 |
| S-1 | 0.20 |
| Gelatin | 1.20 |

Further, the compounds of W-1 to W-3, B-4 to B-6, and F-1 to F-17, an iron salt, a lead salt, a gold salt, a platinum salt, an iridium salt, and a rhodium salt were incorporated into the respective layers in order to improve preservation performance, processing performance, antipressure performance, antimold and fungicidal performances, antistatic performance, and coating performance The compositions of the emulsions used in the respective layers will be shown below:

TABLE 6

| Emulsion | Average AgI content | Average grain size | Grain size fluctuation | Diameter/ thickness ratio | Silver amount ratio Core/middle/shell (AgI content) | Grain structure/ form |
| --- | --- | --- | --- | --- | --- | --- |
| A | 4.0% | 0.45 mm | 27% | 1 | [1/3] (13/1) | Double structure octahedron grain |
| B | 8.9% | 0.70 mm | 14% | 1 | [3/7] (25/2) | Double structure octahedron grain |
| C | 2.0% | 0.55 mm | 25% | 7 | — | Even structure tabular grain |
| D | 9.0% | 0.65 mm | 25% | 6 | [12/59/29] (0/11/8) | Triple structure tabular grain |
| E | 9.0% | 0.85 mm | 23% | 5 | [8/59/33] (0/11/8) | Triple structure tabular grain |
| F | 14.5% | 1.25 mm | 25% | 3 | [37/63] (34/3) | Double structure tabular grain |
| G | 1.0% | 0.07 mm | 15% | 1 | — | Even structure fine grain |

In Table 6:

(1) Emulsions A to F were subjected to a reduction sensitization with thiourea dioxide and thiosulfonic acid in the preparation of the grains according to the examples of JP-A-2-191938

(2) Emulsions A to F were subjected to a gold sensitization, a sulfur sensitization, and a selenium sensitization in the presence of the spectral sensitizing dyes described in the above respective layers and sodium thiocyanate according to the examples of JP-A-3-237450

(3) Low molecular weight gelatin was used in the preparation of the tabular grains according to the examples of JP-A-1-158426

(4) The dislocation lines described in JP-A-3-237450 were observed in the tabular grains and regular crystal grains having a grain structure with a high pressure electron microscope The chemical formulae of the compounds used in coating the light-sensitive layers will be shown below:

ExC-1
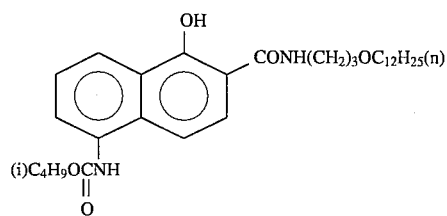
ExC-2
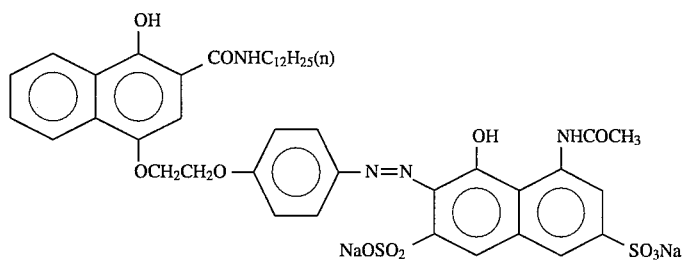
ExC-3
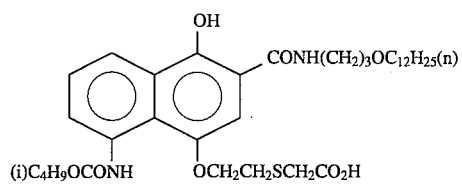
ExC-4
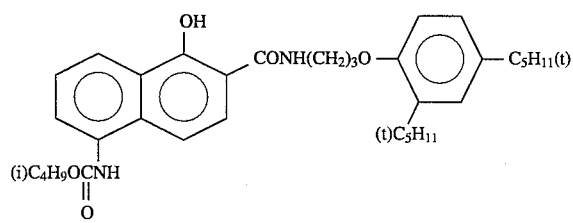
ExC-5
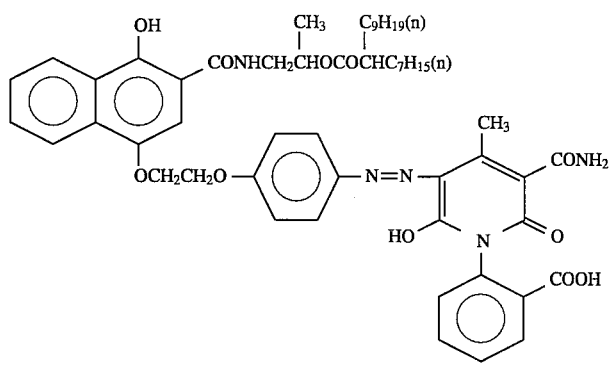
ExC-6
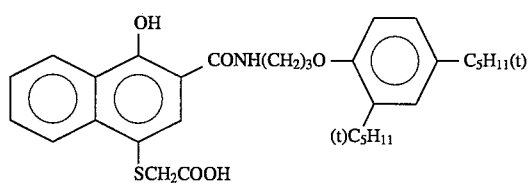

ExC-7
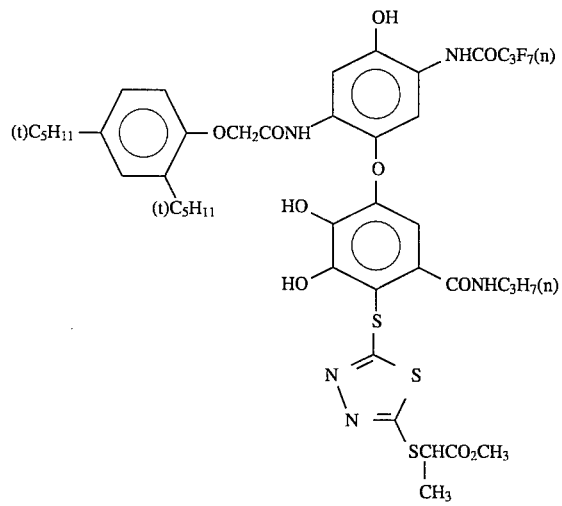
ExC-8
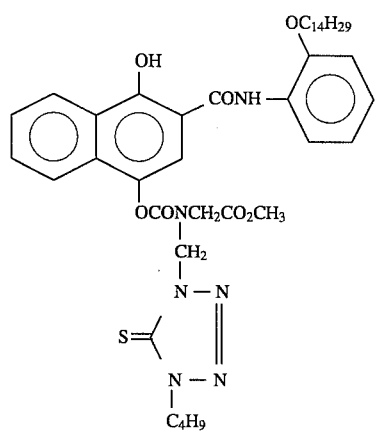
ExM-1
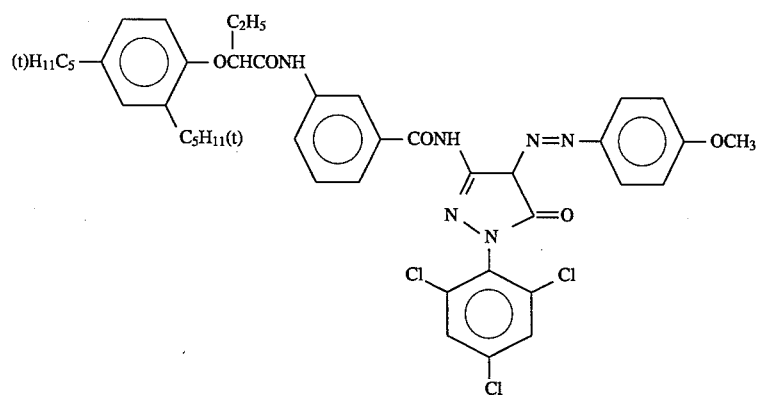

ExM-2
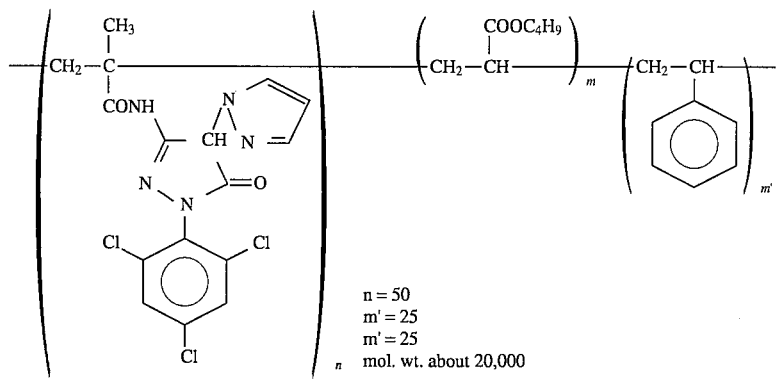
ExM-3
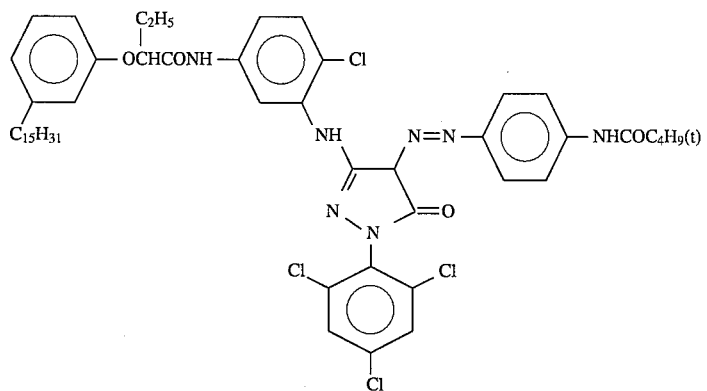
ExM-4
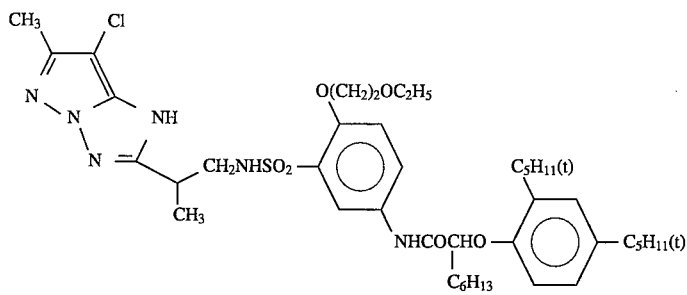
ExM-5
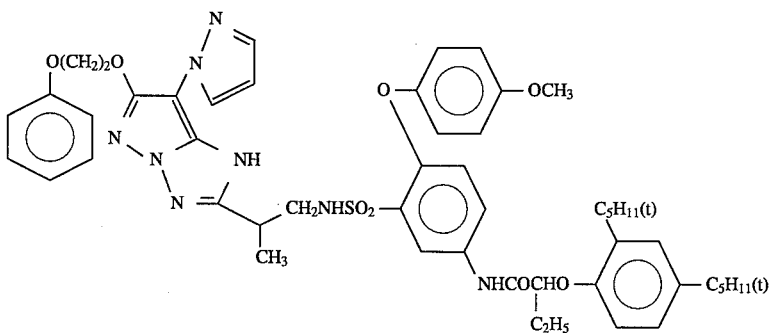

ExY-1
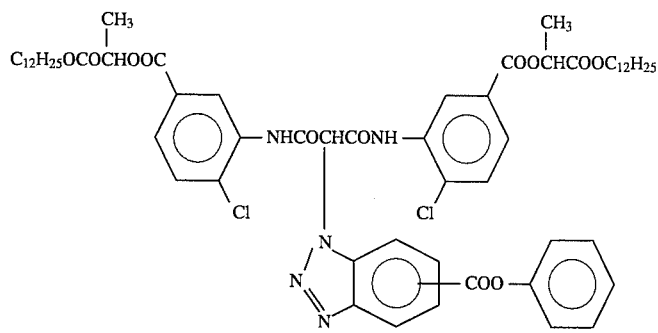
ExY-2
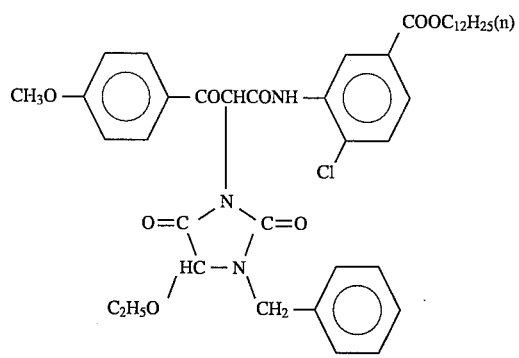
ExY-3
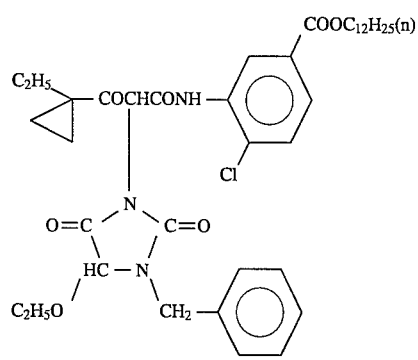
ExY-4
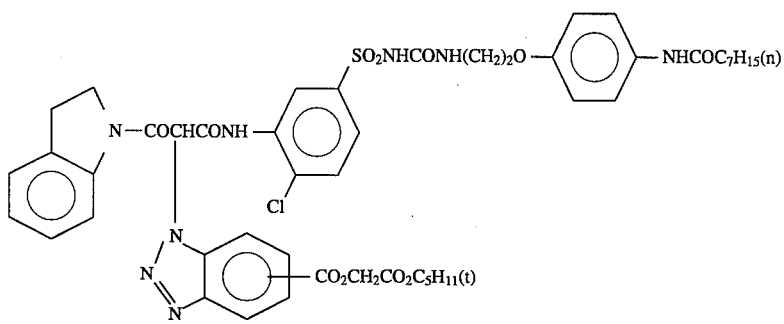
ExF-1
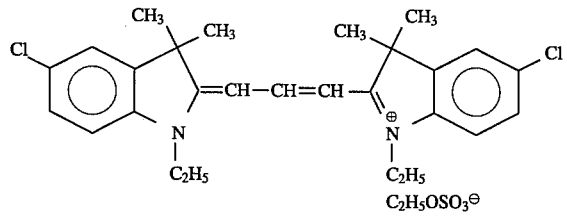
Cpd-1
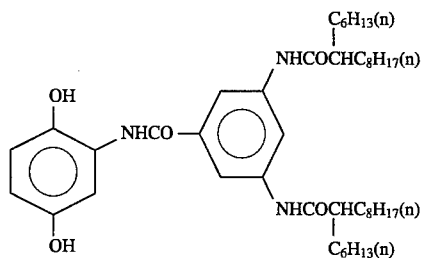
Cpd-2
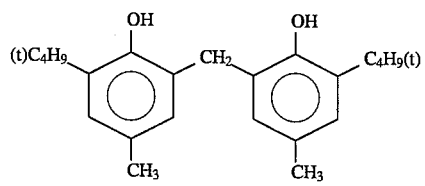
Cpd-3
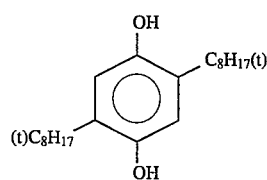

UV-1
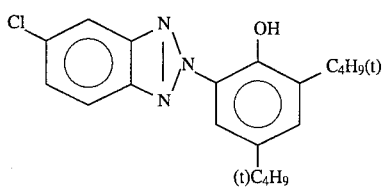
UV-2
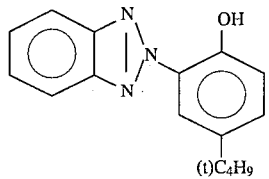
UV-3
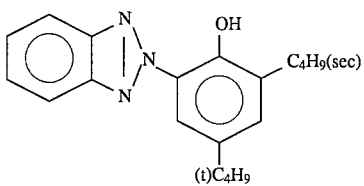
UV-4
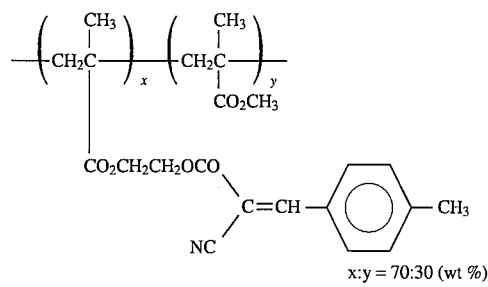
UV-5
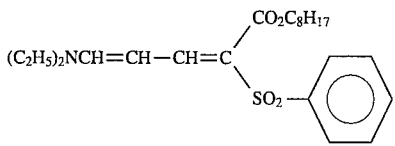
HBS-1
Tricresyl phosphate
HBS-2
Di-n-butyl phthalate
HBS-2
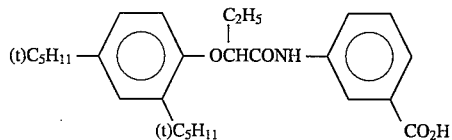
ExS-1
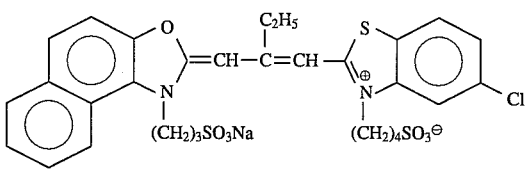
ExS-2
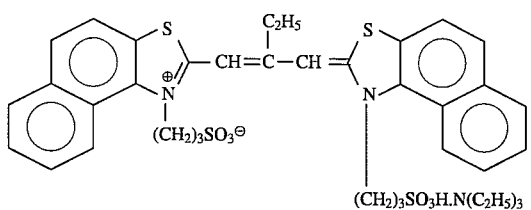
ExS-3
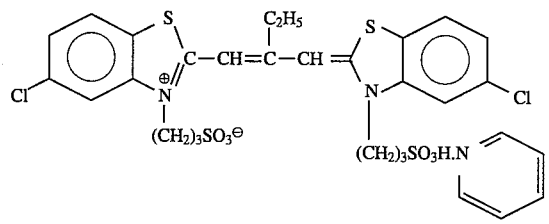
ExS-4
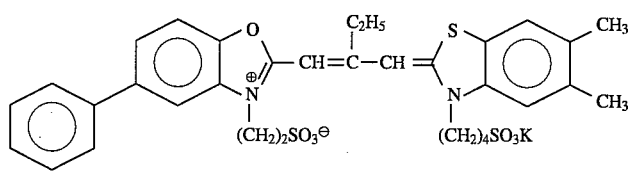

ExS-5
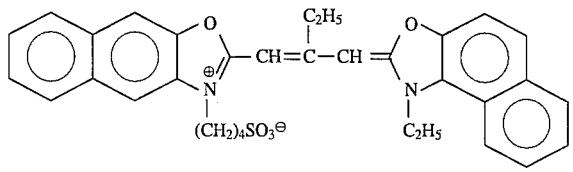
ExS-6
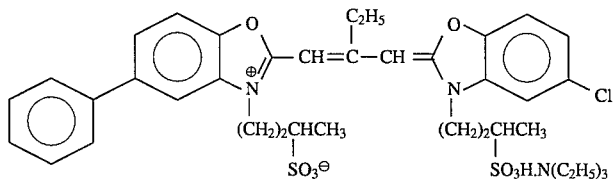
ExS-7
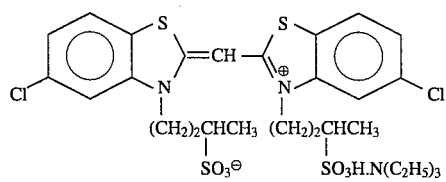
S-1
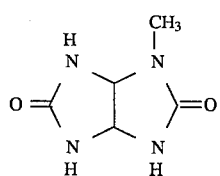
H-1
$CH_2=CH-SO_2-CH_2-CONH-CH_2$
$CH_2=CH-SO_2-CH_2-CONH-CH_2$
B-1
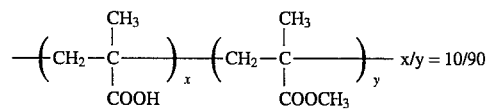 x/y = 10/90
B-2
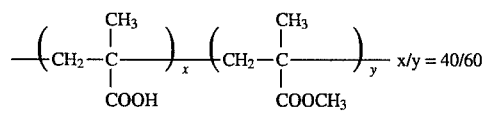 x/y = 40/60
B-3
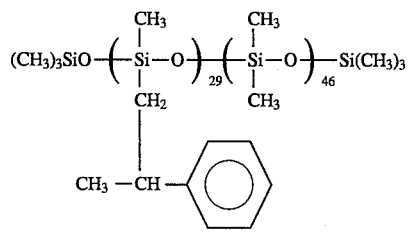
B-4
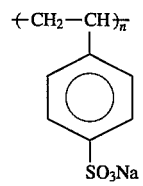
B-5
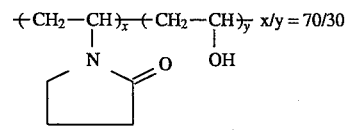 x/y = 70/30
B-6
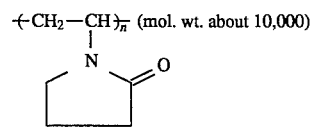 (mol. wt. about 10,000)

W-1
C$_8$F$_{17}$SO$_2$NHCH$_2$CH$_2$CH$_2$OCH$_2$CH$_2$N$^\oplus$(CH$_3$)$_2$
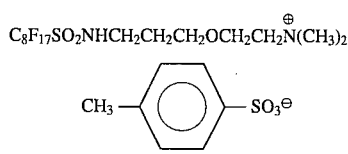
W-2
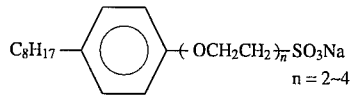
n = 2~4
W-3
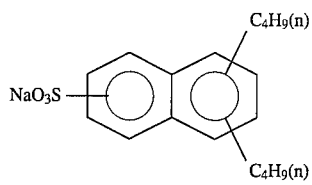
F-1
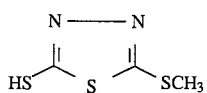
F-2
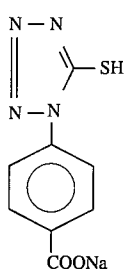
F-3
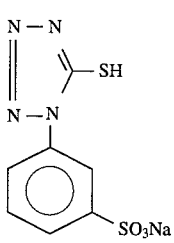
F-4
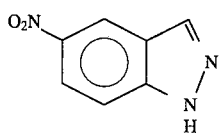
F-5
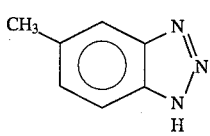
F-6
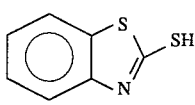
F-7
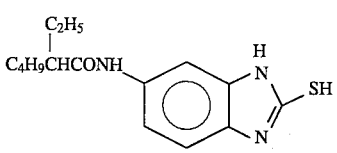
F-8
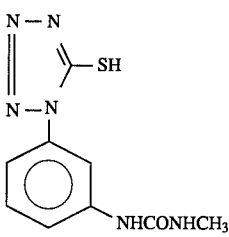
F-9
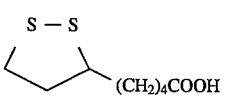
F-10
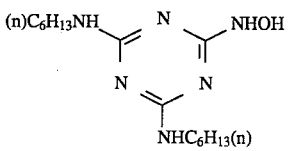
F-11
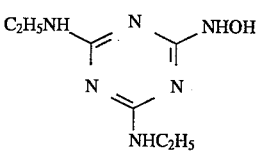

F-12

[Structure: pyrazolopyrimidine with CH₃ and OH substituents]

F-13

CH₃—⟨benzene⟩—SO₂Na

F-14

⟨benzene⟩—SO₂SNa

F-15

[Structure: benzothiazolinone-like ring with S, NH, and C=O]

F-16

⟨benzene⟩—OCH₂CH₂OH

F-17

HO—⟨benzene⟩—COOC₄H₉

Development processing:
The development processing conditions are as follows

| Processing step | Temperature | Time |
|---|---|---|
| Color developing | 38° C. | 3 minutes |
| Stopping | 38° C. | 1 minute |
| Washing | 38° C. | 1 minute |
| Bleaching | 38° C. | 2 minutes |
| Washing | 38° C. | 1 minute |
| Fixing | 38° C. | 2 minutes |
| Washing | 38° C. | 1 minute |
| Stabilizing | 38° C. | 1 minute |

The processing solutions used have the following compositions.

Color-developing solution:

| Caustic soda | 2 g |
|---|---|
| Sodium sulfite | 2 g |
| Potassium bromide | 0.4 g |
| Sodium chloride | 1 g |
| Borax | 4 g |
| Hydroxylamine sulfate | 2 g |
| Disodium ehtylenediaminetetracetate dihydrate | 2 g |
| 4-Amino-3-methyl-N-eythl-N-(β-hydroxyl-ethyl)aniline monosulfate | 4 g |
| Water to make | 1 liter |

Stopping solution:

| Sodium thiosulfate | 10 g |
|---|---|
| Ammonium thiosulfate (70% aqueous solution) | 30 ml |
| Acetic acid | 30 ml |
| Sodium acetate | 5 g |
| Potassium alum | 15 g |
| Water to make | 1 liter |

Bleaching solution:

| Iron (III) sodium ethylenediamine-tetracetate dihydrate | 100 g |
|---|---|
| Potassium bromide | 50 g |
| Ammonium nitrate | 50 g |
| Boric acid | 5 g |
| Ammonia water | adjusting pH to 5.0 |
| Water to make | 1 liter |

Fixing solution:

| Sodium thiosulfate | 150 g |
|---|---|
| Sodium sulfite | 15 g |
| Borax | 12 g |
| Acetic acid glacial | 15 ml |
| Potassium alum | 20 g |
| Water to make | 1 liter |

Stabilizing solution:

| Boric acid | 5 g |
|---|---|
| Sodium citrate | 5 g |
| Sodium metaborate(tetrahydrate) | 3 g |
| Potassium alum | 15 g |
| Water to make | 1 liter |

The multilayer color photographic materials thus obtained were checked for the evenness of the emulsion coating. The results thereof are shown in Tables 1 to 5.

According to the results summarized in Tables 1 to 5, Examples 1 to 26 of the invention had a good flatness after heat treatment and the emulsion coating was even. Meanwhile, any of the comparisons falling out of the range of the present invention had a bad face condition after the heat treatment and the coating of the emulsion was uneven.

While the invention has been described in detail and with reference to specific embodiments thereof, it will be apparent to one skilled in the art that various changes and modifications can be made therein without departing from the spirit and scope thereof.

What is claimed is:

1. A polyester support prepared by the step of
   (1) subjecting a polyester film to bulk rolling and heating the bulk rolled polyester film to a temperature of from 50° C. to the glass transition point of the polyester film for 0.1 to 1500 hours, or (2) subjecting a polyester film to bulk rolling at a temperature from 50° C. to the glass transition point of the polyester film for 0.1 to 1500 hours, resulting in the polyester support, wherein the polyester film comprises a polyester obtained by condensation polymerization of a diol and at least naphthalene dicarboxylic acid or an ester derivative thereof, wherein the glass transition point of the polyester film is 90° to 200° C., and wherein the step of bulk rolling has a start tension of 3 to 75 kg/m per unit width of the polyester film and an end tension of 3 to 75 kg/m per unit width of the polyester film.

2. The polyester support as in claim 1, wherein the support satisfies the following conditions:

(1) Max-Min in a whole widthwise direction: TD R value 8 μm or less, (2) Max-Min with a length of 5 m in a lengthwise direction: MD R value 10 μm or less, (3) thickness difference between an adjacent hill and hollow: MD fluctuation 8 μm or less, (4) based on a base line which is an average of thicknesses at both ends, a maximum value of hills above this base line: base line value 5 μm or less, and (5) a maximum displacement from a line obtained by connecting both ends of the base with a width of 40 m which is spread on a plane: circular value 40 mm or less.

3. The polyester support as in claim 1, wherein a material of a core on which the film is rolled is selected from metal, ceramics, ceramic-coated metal and fiber winding plastic.

4. The polyester support as in claim 1, wherein a diameter of the core on which the film is rolled is 100 mm to 600 mm.

5. The polyester support as in claim 1, wherein the polyester support is mainly composed of polyethylene naphthalate.

6. The polyester support as in claim 1, wherein the polyester support is mainly composed of polyethylene-2,6-naphthalene dicarboxylate.

7. The polyester support as in claim 1, wherein the polyester film is biaxially oriented by 3.0 to 3.5 in a lengthwise direction and by 3.0 to 4.2 times in a widthwise direction.

8. The polyester support as in claim 1, wherein the polyester film is subjected to a knurling treatment.

9. The polyester support as in claim 8, wherein the thickness subjected to knurling is 5 to 50 μm larger than the average thickness.

10. The polyester support as in claim 1, wherein the polyester support has a thickness of 60 to 90 μm.

11. The polyester support as claimed in claim 1, wherein the start tension is from 10 to 40 kg/m per unit width of the polyester film and the end tension is from 5 to 35 kg/m per unit width of the polyester film.

* * * * *